(12) United States Patent
Yoshimura et al.

(10) Patent No.: US 7,436,144 B2
(45) Date of Patent: Oct. 14, 2008

(54) INVERTER APPARATUS

(75) Inventors: Manabu Yoshimura, Tokyo (JP);
Toshiyuki Kaitani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 380 days.

(21) Appl. No.: 10/573,858

(22) PCT Filed: Sep. 30, 2003

(86) PCT No.: PCT/JP03/12497

§ 371 (c)(1),
(2), (4) Date: Mar. 29, 2006

(87) PCT Pub. No.: WO2005/034327

PCT Pub. Date: Apr. 14, 2005

(65) Prior Publication Data

US 2006/0239047 A1 Oct. 26, 2006

(51) Int. Cl.
*G05B 11/28* (2006.01)

(52) U.S. Cl. .............. 318/599; 318/811; 318/432; 318/727

(58) Field of Classification Search .......... 318/432, 318/434, 599, 811, 798, 801, 807
See application file for complete search history.

(56) References Cited

U.S. PATENT DOCUMENTS

| | | | | |
|---|---|---|---|---|
| 5,481,166 A | * | 1/1996 | Moreira | 318/400.04 |
| 6,097,171 A | * | 8/2000 | Branecky | 318/808 |
| 6,462,492 B1 | * | 10/2002 | Sakamoto et al. | 318/400.32 |
| 2001/0008371 A1 | * | 7/2001 | Norrkniivila et al. | 318/599 |

FOREIGN PATENT DOCUMENTS

| | | |
|---|---|---|
| JP | 1-303063 A | 12/1989 |
| JP | 4-172972 A | 6/1992 |
| JP | 6-22556 A | 1/1994 |
| JP | 2001-197725 A | 7/2001 |

* cited by examiner

*Primary Examiner*—Rina I Duda
(74) *Attorney, Agent, or Firm*—Sughrue Mion, PLLC

(57) ABSTRACT

A CPU calculates, based on a frequency command value for driving a motor and on a state quantity of the motor, an output-voltage command value in which only the phase advances while amplitude is constant in each calculation period, without reducing the calculation period. An ASIC reflects the output-voltage command value in a triangular wave signal in a time-series order to compare with each other, and outputs a PWM signal to a switching circuit. Thus, a waveform of an output voltage is made close to a sine wave irrespective of an output frequency being high or low, and a processing load of the CPU is reduced.

2 Claims, 6 Drawing Sheets

(1) OUTPUT VOLTAGE COMMAND DESIRED TO OUTPUT (2) OUTPUT VOLTAGE COMMAND TO BE OUTPUT

ΔV/N

CALCULATION PERIOD

OUTPUT VOLTAGE 8

SINE WAVE 7

CALCULATION PERIOD (1) WAVEFORM OF OUTPUT VOLTAGE BASED ON CONVENTIONAL TECHNOLOGY

CALCULATION PERIOD ΔT (2) WAVEFORM OF OUTPUT VOLTAGE ACCORDING TO THE EMBODIMENT

INVERTER APPARATUS

TECHNICAL FIELD

The present invention relates to an inverter device for driving a motor at an arbitrary frequency.

BACKGROUND ART

An inverter device for driving a motor such as an induction motor and a synchronous motor generally includes an output-voltage calculating unit that calculates an output voltage command in each calculation period, based on a frequency command value input to drive a motor and a state quantity of the motor detected; a PWM-pattern generating unit that outputs a PWM (pulse-width modulation) signal based on a comparison between an output-voltage command value output by the output-voltage calculating unit and a triangular wave signal; and a switching unit that switches a direct voltage according to the PWM signal output by the PWM-pattern generating unit and supplies an alternating voltage with a predetermined frequency to the motor. However, the waveform of the alternating voltage output by the switching unit becomes a staircase pattern, and hence, for the purpose of reducing current ripple or the like, various devices are proposed so as to allow the waveform of an output voltage to approach a sine wave as close as possible.

For example, Japanese Patent Application Laid-Open No. H6-22556 discloses a technology of obtaining a smooth output voltage by dividing a difference $\Delta V$, between an output-voltage command value V1 calculated in one calculation period and an output-voltage command value V2 calculated in the next one calculation period, by the number N of vertices of a triangular wave signal included in one calculation period, and by linearly complementing and changing an amplitude value of each of the output-voltage command values, by $\Delta V/N$ each, at each vertex of the triangular wave signal included in the calculation period, to thereby change the output-voltage command value from a staircase pattern to a linear pattern.

Japanese Patent Application Laid-Open No. H6-22556

In the above technology however, a code indicating a direction of voltage change in one calculation period is fixed. Therefore, as shown in FIG. 1, if the direction of voltage change is reversed in the middle of the one calculation period, an output-voltage command value indicating such a change cannot be obtained. This case is specifically explained with reference to FIG. 1. FIG. 1 is a diagram of the comparison between a changing waveform of an output voltage command that is desired to actually output and a changing waveform of an output voltage command that is actually output.

FIG. 1(1) illustrates a correlation between a changing waveform 1 of the output voltage command that is desired to actually output and a triangular wave signal 2 in one calculation period. FIG. 1(2) illustrates a correlation between a changing waveform 3 of the output voltage command that is actually output and the triangular wave signal 2 in one calculation period. As shown in FIG. 1, an amplitude value of the output voltage command in one calculation period is changing by each $\Delta V/N$ at each vertex of the triangular wave signal 2.

When vertices (e.g., a maximum value point on the positive side) of the sine wave are included in one calculation period as shown in FIG. 1(1), the changing waveform 1 of the output voltage command, which is actually desired to be output, becomes a staircase waveform in which an upward staircase is followed by a downward staircase portion 4 in the one calculation period. On the contrary, in the technology described in the Japanese Patent Application Laid-Open No. H6-22556, because the direction of voltage change is one direction in the one calculation period as shown in FIG. 1(2), the changing waveform 2 of the output voltage command, which is actually output, is only an upward staircase pattern. Therefore, the changing waveform 2 becomes a waveform of the upward staircase in an area 5 corresponding to the downward staircase portion 4 in the changing waveform 1 of the output voltage command, which is actually desired to be output as shown in FIG. 1(1).

To avoid this pattern, an area divided by a dotted line needs to be reduced by one portion so that the downward staircase portion 4 of FIG. 1(1) is included in the next calculation period, namely, the calculation period is shortened. Alternatively, the calculation period needs to coincide with the phase of the sine wave by shifting the phase of the sine wave to the right as the whole. To implement this, in the former case, a CPU that calculates an output voltage command needs to be upgraded, which causes an increase in cost. In the latter case, the processing load increases.

FIG. 2 is a diagram of the comparison between an output voltage waveform and a sine waveform. FIG. 2 illustrates a waveform of an output voltage 8 when ¼ cycle of a sine wave 7 is set to one calculation period. As shown in FIG. 2, a voltage between calculation periods is obtained by linear complement. Therefore, the output voltage 8 is output as a voltage that linearly changes between calculation periods. At this time, if an output frequency is low, the calculation period with respect to the cycle of the sine wave becomes sufficiently short, which allows the sine wave to be divided into fine intervals. Therefore, deviation from the sine wave is small even by the linear complement, but if the output frequency is high, the calculation period becomes comparatively long. Therefore, in the conventional technology, it becomes difficult to approximate a fine curve of the sine wave, which causes the deviation from the sine wave to become significant.

The present invention has been achieved in view of the above problems, and it is an object of the present invention to obtain an inverter device capable of approaching the waveform of an output voltage closer to a sine wave irrespective of whether output frequency is high or low, as compared with the conventional technology, and of reducing the processing load of a CPU that calculates an output voltage command.

DISCLOSURE OF INVENTION

In the present invention, an inverter device includes an output-voltage calculating unit that calculates an output voltage command based on a frequency command value for driving a motor and a state quantity of the motor, in each calculation period; a PWM-pattern generating unit that outputs a PWM signal according to an output-voltage command value output by the output-voltage calculating unit; and a switching unit that switches a direct voltage according to the PWM signal output by the PWM-pattern generating unit and supplies an alternating voltage with a predetermined frequency to the induction motor. The output-voltage calculating unit includes a function of calculating a plurality of output-voltage command values in which amplitudes are the same as each other but only phase advances under a fixed condition, in each calculation period.

According to the present invention, the output-voltage command value in which only the phase advances is updated a plurality of times within a calculation period. Therefore, even if there are a small number of calculation periods in the cycle of a fundamental wave of an output voltage, it is possible to obtain an output voltage with a waveform closer to the sine wave. Therefore, the current ripple is reduced more as compared with the conventional technology, thus achieving torque ripple reduction and efficiency increase. Furthermore, a CPU that calculates the output voltage command only needs to add a function of calculating a plurality of output-voltage command values in which only the phase advances. Therefore, the processing load of the CPU can be reduced, thus, there is no need to use an expensive CPU.

BEST MODE(S) FOR CARRYING OUT THE INVENTION

Exemplary embodiments of an inverter device according to the present invention are explained in detail with reference to the accompanying drawings.

Figure 1:
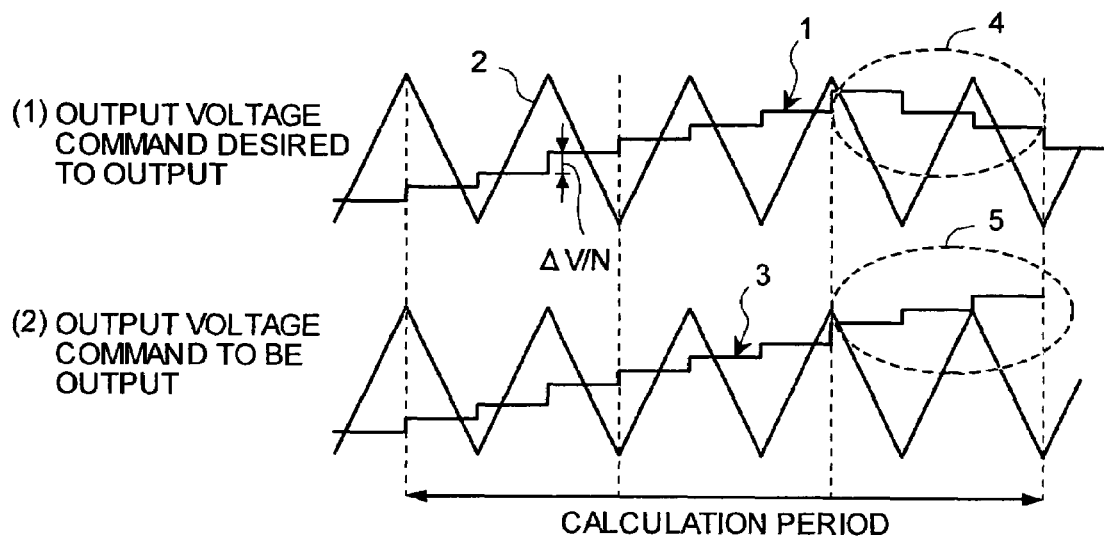
FIG. 1 is a diagram of the comparison between a changing waveform of an output voltage command that is actually desired to be output and a changing waveform of an output voltage command that is actually output.
Figure 2:
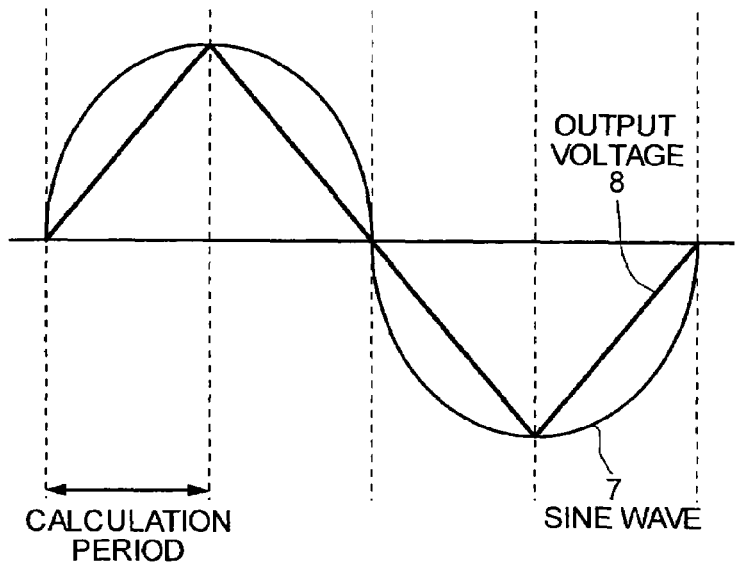
FIG. 2 is a diagram of the comparison between an output voltage waveform and a sine waveform.
Figure 3:
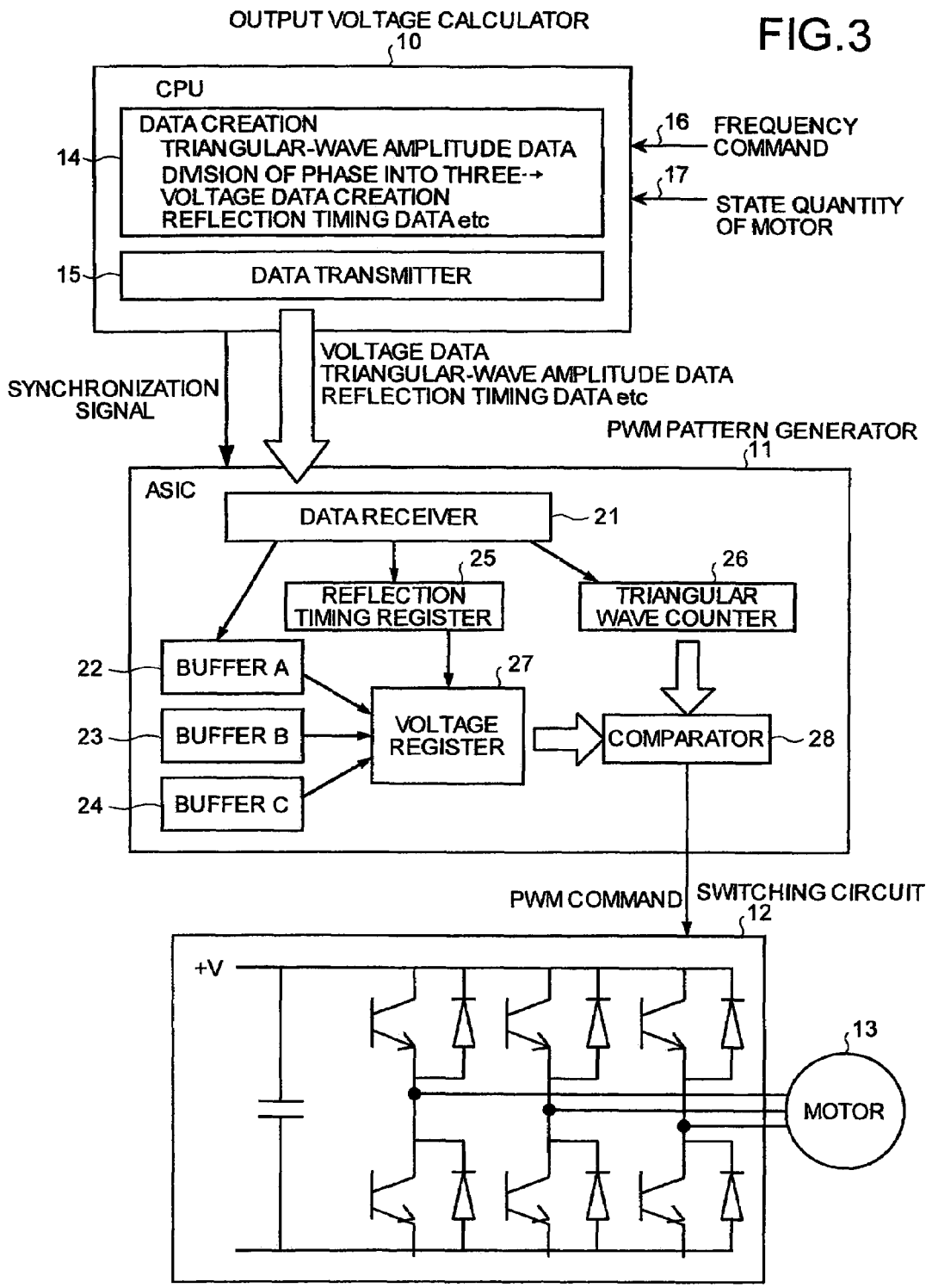
FIG. 3 is a block diagram of the configuration of an inverter device according to one embodiment of the present invention.

FIG. 3 is a block diagram of the configuration of an inverter device according to one embodiment of the present invention. The inverter device of FIG. 3 includes an output voltage calculator 10, a PWM pattern generator 11 that receives an output of the output voltage calculator 10, and a switching circuit 12 that receives an output of the PWM pattern generator 11. The switching circuit 12 is connected with a motor (an induction motor or a synchronous motor) 13. The motor 13 is shown here as a three-phase motor.

The output voltage calculator 10 includes a central processing unit (hereinafter, "CPU") 14 that creates various types of data, and a data transmitter 15 being an interface for transmitting the data created to the PWM pattern generator 11.

To the CPU 14, a frequency command 16 for driving the motor 13 and a state quantity 17 of the motor 13 are input from the outside. The state quantity 17 includes a current value as a main value when the motor 13 is an induction machine, and further includes a speed value added to the main value when the motor 13 is a synchronous machine. The current value is detected by fixing a current detector (a current transformer and a resistor, etc.) to an electric wire. The speed value is detected by fixing an encoder to the rotary shaft of the motor 13. In this specification, the motor 13 is the induction machine and the state quantity 17 is the current value.

The CPU 14 loads the state quantity 17 of the motor 13 detected in each calculation period, and calculates an output voltage command (voltage data) based on the state quantity 17. Further, the CPU 14 creates triangular-wave amplitude data for providing the cycle of a triangular wave signal being a carrier wave for obtaining a PWM signal, and reflection timing data for providing the number of vertices of a triangular wave signal for defining intervals of reflection.

At this time at which an output voltage command is to be calculated, the CPU 14 calculates a plurality of output-voltage command values in which the amplitudes are the same as each other but only the phase advances in the calculation period under a fixed condition. In the embodiment, three output-voltage command values are obtained as the output-voltage command values.

As a result of this, the data (voltage data, triangular-wave amplitude data, reflection timing data, etc.) created is transmitted from the data transmitter 15 to the PWM pattern generator 11. A synchronization signal for synchronization between the calculation period and the reflection timing is also transmitted thereto.

The PWM pattern generator 11 is implemented by ASIC being a dedicated semiconductor integrated circuit. An ASIC 11 includes a data receiver 21 being an interface, a buffer A22, a buffer B23, a buffer C24, a reflection timing register 25, a triangular wave counter 26, and a comparator 28.

The data receiver 21 loads the data (voltage data, triangular-wave amplitude data, reflection timing data, etc.) created in the CPU 14, outputs the voltage data to the buffer A22, the buffer B23, and the buffer C24, respectively, to be temporarily stored. At this time, when there is one voltage data, the one voltage data is output to the three buffer A22, the buffer B23, and the buffer C24. However, if there are three voltage data, the three voltage data are output to the three buffer A22, the buffer B23, and the buffer C24, respectively, in the time-series order.

Furthermore, the data receiver 21 outputs the reflection timing data loaded, to the reflection timing register 25, and outputs the triangular-wave amplitude data to the triangular wave counter 26. A voltage register 27 uses the reflection timing data stored in the reflection timing register 25. The triangular wave counter 26 increments or decrements the counter according to the triangular-wave amplitude data to generate a triangular wave, and supplies the triangular wave created to the comparator 28.

The voltage register 27 loads the data stored in the buffer A22, the buffer B23, and the buffer C24 in the time-series order based on the synchronization signal and the reflection timing data, stores them for a fixed period (period for a predetermined number of vertices of a triangular wave signal), respectively, and supplies the data to the comparator 28.

The comparator 28 compares a value of the voltage register 27 with a value of the triangular wave counter 26, and outputs a PWM command, being a pulse signal of which pulse width is changed, to the switching circuit 12.

The switching circuit 12 performs on-off operation according to the PWM command output by the PWM pattern generator (ASIC) 11 so that three upper-arm switching elements and three lower-arm switching elements do not mutually overlap each other, creates a three-phase alternating voltage with a predetermined frequency from a direct voltage of +V, and supplies the voltage to the motor 13.

Figure 4:
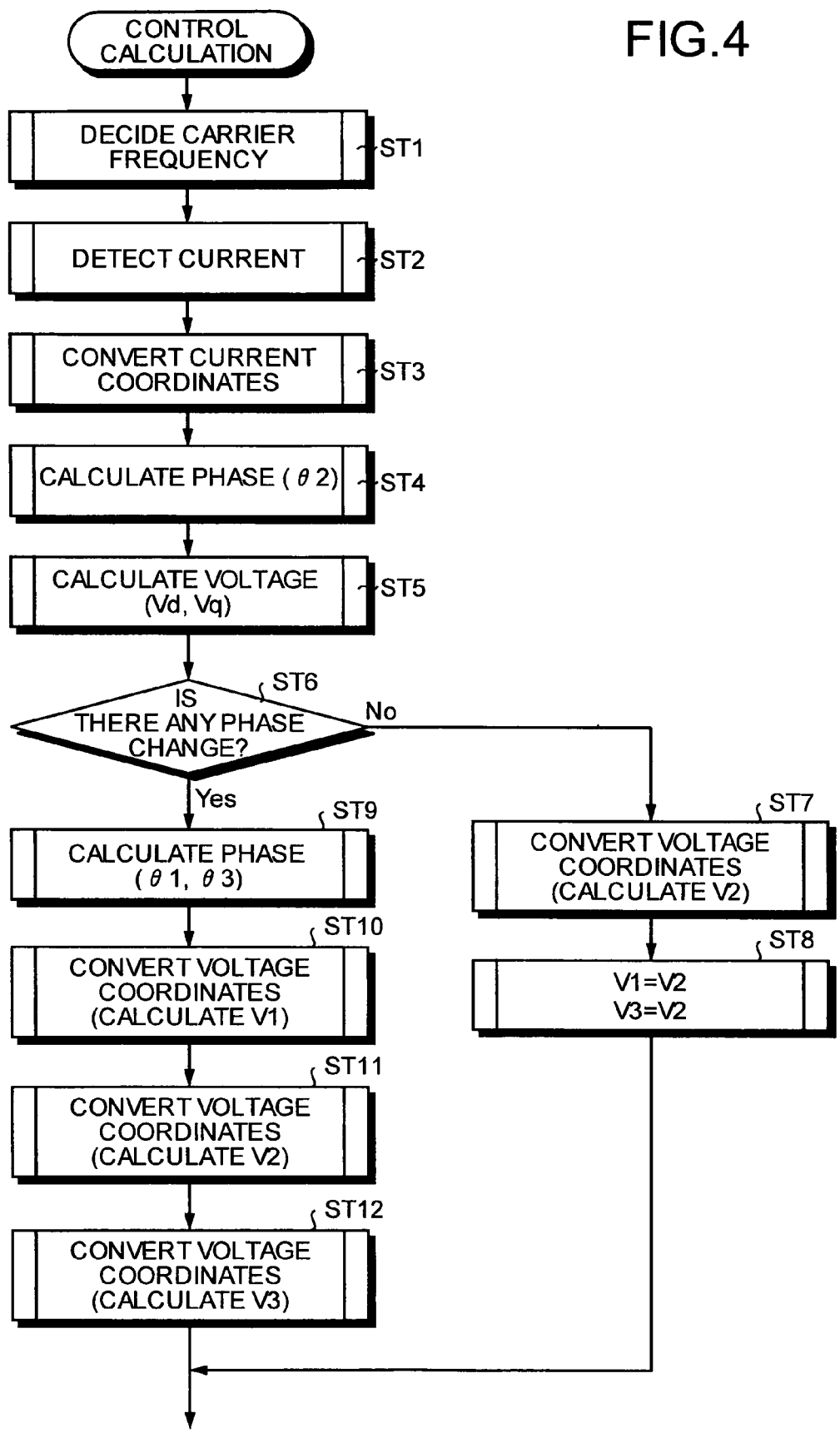
FIG. 4 is a flowchart for explaining the operation of an output voltage calculator shown in FIG. 3.

The operation of the inverter device according to the embodiment is explained below with reference to FIG. 3 through FIG. 7. An overall calculation operation in the output voltage calculator is explained first with reference to FIG. 4. FIG. 4 is a flowchart for explaining the operation of the output voltage calculator shown in FIG. 3.

In FIG. 4, the CPU 14 decides a frequency of a triangular wave signal, being a carrier wave of a PWM signal, based on the frequency command 16 received, and creates triangular-wave amplitude data (step ST1). Then, the CPU 14 executes processes at step ST2 to step ST12 in each calculation period of a predetermined time period ΔT, to obtain a three-phase alternating output-voltage command value V (Vu, Vv, Vw).

In other words, the CPU 14 detects a current value which is the state quantity 17 of the motor (step ST2), and converts current coordinates to a rotating orthogonal coordinate system in which d axis-q axis are set to two axes orthogonal to each other (step ST3). Then, the CPU 14 calculates a phase θ in the sine wave in the calculation period from the rotating coordinates (step ST4). Herein, in the embodiment, the phase θ in one calculation period of the time period ΔT is divided into three parts, such as a phase (hereinafter, "pre phase") θ1 in a first time period ΔT/3, a phase (hereinafter, "center phase") θ2 in a second time period ΔT/3, and a phase (hereinafter, "post phase") θ3 in a third time period ΔT/3, and each output-voltage command value in the respective phases is obtained (see FIG. 5). Therefore, at step ST4, the CPU 14 obtains the center phase θ2.

Then, the CPU 14 obtains a voltage Vd and a voltage Vq as direct current (step ST5), and determines whether there is any phase change (step ST6). In general, an amplitude value at time t of the sine wave that rotates at an angular frequency ω is expressed by Asin ωt based on the amplitude A, the angular frequency ω, and the time t, and the phase θ at this time is ωt. Because the time t is an integration of time periods ΔT including calculation periods, the phase θ becomes θ=ωΣΔT. A phase change amount Δθ between calculation periods is Δθ=ωΔT. Therefore, at step ST6, an angular frequency ω of an output voltage is monitored to enable determination on the phase change amount, and it is possible to determine in which phase of the sine wave the calculation period is included. It is noted that the phase θ is an integration of phase change amounts ΔθO, i.e., θ=ΣΔθ.

For example, if the phase change amount is a predetermined value or less, it is determined that there is no phase change (step ST6, No). In this case, θ2=θ1=θ3, and hence, a voltage V2 in the center phase θ2 is obtained through voltage coordinate conversion (step ST7), and both a voltage V1 in the pre phase θ1 and a voltage V3 in the post phase θ3 are set to a value equal to the voltage V2 without calculation (step ST8), and the value is set to the output-voltage command value V (Vu, Vv, Vw) in the calculation period. The procedure at step ST1 to step ST4, step ST7, and step ST8 is a conventionally executed one.

However, in the conventional technology, because there is no idea that the phase in one calculation period is divided, the phase θ in the calculation period is obtained at step ST4. Step ST8 is a procedure newly generated when the phase in one calculation period is divided in the embodiment. Therefore, in the embodiment, the process, which is added when one output voltage command is calculated in one calculation period in the same manner as the conventional technology, is the procedure executed at step ST8, and there is an extremely small amount of increase in the process.

On the other hand, if the phase change amount exceeds the predetermined value, it is determined that there is any phase change (step ST6: Yes), and the CPU 14 obtains the pre phase θ1 and the post phase θ3, respectively (step ST9), and further obtains an output-voltage command value V1 (Vu1, Vv1, Vw1) in the pre phase θ1, an output-voltage command value V2 (Vu2, Vv2, Vw2) in the center phase θ2, and an output-voltage command value V3 (Vu3, Vv3, Vw3) in the post phase θ3, respectively, through voltage coordinate conversion (step ST10 to step ST12).

Figure 5:
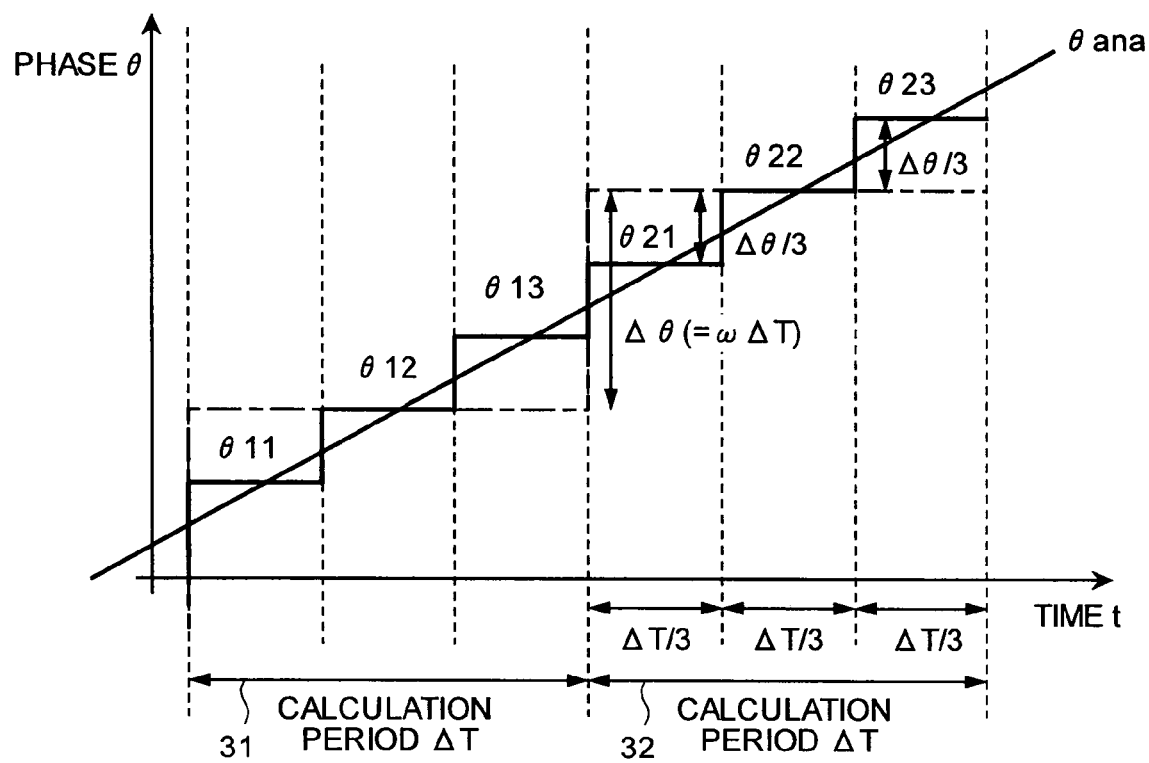
FIG. 5 is a time chart for explaining a specific example of operations for generating a plurality of output voltage commands in one calculation period in the output voltage calculator shown in FIG. 3.

The operations at step ST4 and step ST9 to step ST12 are explained below with reference to FIG. 5. FIG. 5 is a time chart for explaining a specific example of operations for generating a plurality of output voltage commands in one calculation period in the output voltage calculator shown in FIG. 3. In FIG. 5, the vertical axis is phase θ and the horizontal axis is time t.

In FIG. 5, there are shown two successive calculation periods 31 and 32 with respect to an analog phase θana linearly rising from bottom left to top right at a certain angle, in a first-half cycle in a positive half cycle of the sine wave. Each time period of calculation periods is expressed by ΔT.

In the calculation period 31, the phase changes in the order of a pre phase θ11 in a first time period ΔT/3, a center phase θ12 in a second time period ΔT/3, and a post phase θ13 in a third time period ΔT/3. In the calculation period 32, the phase changes in the order of a pre phase θ21 in a first time period ΔT/3, a center phase θ22 in a second time period θT/3, and a post phase θ23 in a third time period ΔT/3.

In each of the calculation period 31 and the calculation period 32, respective change amounts of the pre phase θ1 and the post phase θ3 with respect to the center phase θ2 are equal to each other, which is Δθ/3. A phase change amount (phase advance portion) Δθ between the calculation period 31 and the calculation period 32 is given as a difference between the center phase θ12 and the center phase θ22, which is Δθ=ωΔT, as explained above.

The calculation period 32 is explained below as one example. In the conventional technology, the phase θ obtained at step ST4 of FIG. 4 is the center phase θ22, and this phase is the phase as the whole of one calculation period. In the embodiment, however, the phase θ is divided into three parts and calculated. More specifically, the phases of the three parts are obtained by first obtaining the center phase θ22 at step ST4 of FIG. 4 using the conventional technique, and then obtaining the pre phase θ21 when −ΔT/3. and the post phase θ23 when +ΔT/3, based on the center phase θ22 as a center, at step ST9 of FIG. 4.

The phase advance portion Δθ is obtained by a product ωΔT of the angular frequency and the time period of the calculation period, as explained above. Therefore, if the output frequency does not change within the calculation period, the pre phase θ21 and the post phase θ23 can be calculated, respectively, at step ST9 of FIG. 4, as follows:

θ21=θ22−ωΔT/3=θ22−Δθ/3

θ23=θ22+ωΔT/3=θ22+Δθ/3

At step ST10 to step ST12 of FIG. 4, three output-voltage command values corresponding to one calculation period of a time period ΔT are calculated respectively using the three phases obtained in the above manner. This allows only the phase of each output voltage of the inverter in one calculation period of the time period ΔT to be changed by a time period of ΔT/3 each.

Figure 6:
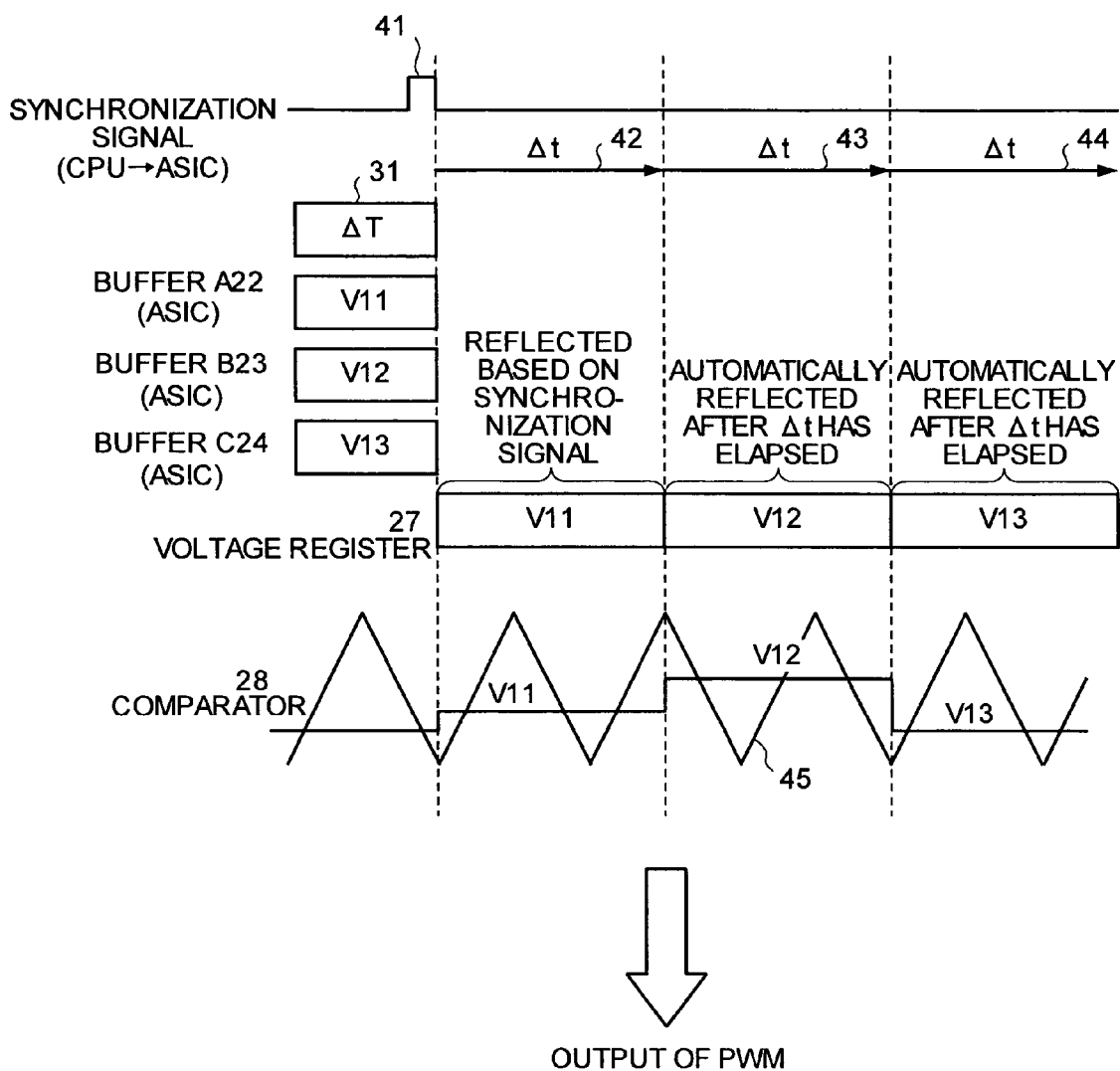
FIG. 6 is a time chart for explaining the operations of a PWM pattern generator (ASIC) shown in FIG. 3.

FIG. 6 is a time chart for explaining the operations of a PWM pattern generator (ASIC) shown in FIG. 3. In FIG. 6, there are shown the operations of the components in the ASIC 11 when the CPU 14 transmits the following data to the ASIC 11, such as a synchronization signal 41, three voltage data V11, V12, and V13, reflection timing 42, 43, and 44 of each time period ΔT corresponding thereto, and data for a triangular wave signal 45, in the calculation period 31 shown in FIG. 5.

When the calculation process of the voltage data V11, V12, and V13 is finished in the calculation period 31 of the time period ΔT, the CPU 14 immediately performs a transmission process and quickly transmits the voltage data V11, V12, and V13 together with other data to the ASIC 11, and allows the ASIC 11 to store them in the buffers. Thereafter, the synchronization signal 41 is transmitted.

Therefore, as shown in FIG. 6, in the ASIC 11, in the calculation period 31 of the time period ΔT, the voltage data V11 is first stored in the buffer A22, the voltage data V12 is stored in the buffer B23, and then, the voltage data V13 is stored in the buffer C24.

The voltage register 27 fetches the voltage data V11 from the buffer A22 in response to the synchronization signal 41, stores the data for a time period Δt of the reflection timing 42, and then outputs the data. When the time period Δt of the reflection timing 42 has elapsed, the voltage register 27 fetches the voltage data V12 from the buffer B23, stores the data for a time period Δt of the reflection timing 43, and then outputs the data. Likewise, when the time period Δt of the reflection timing 43 has elapsed, the voltage register 27 fetches the voltage data V13 from the buffer C24, stores the data for a time period Δt of the reflection timing 44, and then outputs the data.

The comparator 28 reflects the voltage data V11, V12, and V13 respectively in the triangular wave signal 45 which is an output of the triangular wave counter 26, in the respective time periods Δt of the reflection timing 42, 43, and 44, and outputs a PWM signal to the switching circuit 12. Herein, each time period Δt of the reflection timing 42, 43, and 44 indicates a period during which a predetermined number (three in the example of FIG. 6) of vertices of the triangular wave signal 45 has passed, and the start point and the end point thereof synchronize to the vertices of the triangular wave signal 45.

In this manner, the three output-voltage command values calculated by the CPU 14 within the time period ΔT of one calculation period are automatically reflected at a timing specified by the CPU 14 in the ASIC 11, and a PWM signal is created. The CPU 14 only specifies the reflection timing and does not perform reflection process, and hence, the processing load is reduced.

Figure 7:
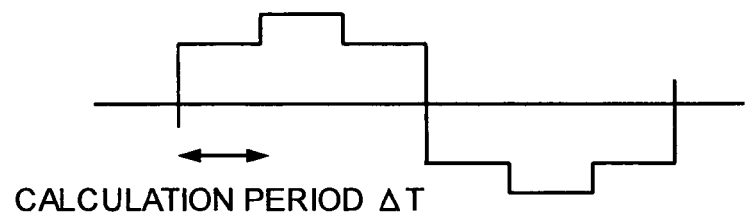
FIG. 7 is a waveform diagram of the comparison between an output voltage obtained by the inverter device shown in FIG. 3 and an output voltage based on the conventional technology.
Figure 7:
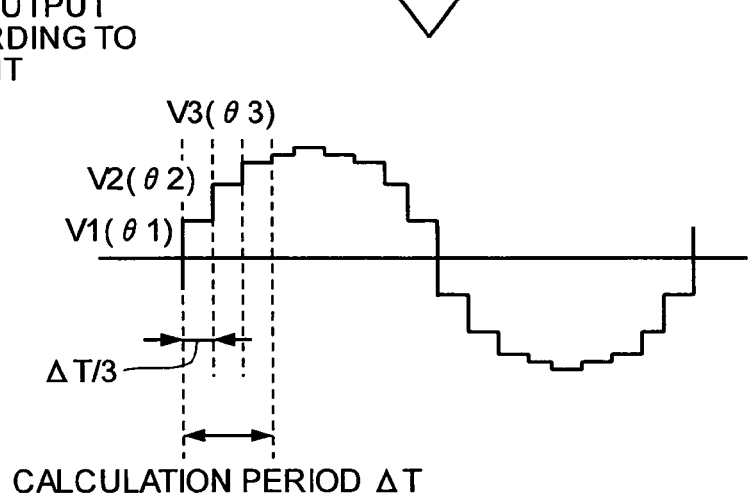

FIG. 7 is a waveform diagram of the comparison between an output voltage obtained in the inverter device shown in FIG. 3 and an output voltage based on the conventional technology. FIG. 7(1) indicates a waveform of the output voltage obtained by the conventional technology. FIG. 7(2) indicates a waveform of the output voltage obtained by the embodiment.

As is clear from the explanation of the operations with reference to FIG. 4, in the conventional technology, one output-voltage command value is obtained in each calculation period (time period ΔT). Therefore, when the output frequency becomes high and the calculation period become relatively long, the waveform of the output voltage becomes a staircase-shaped waveform in which the steps are significant, as shown in FIG. 7(1).

On the other hand, in the embodiment, in the calculation period (time period ΔT) in which the phase change amount exceeds, for example, a predetermined value as shown in FIG. 7(2), only the phase is divided into three parts, and three output-voltage command values are obtained one by one in each time period ΔT/3, such as V1 (θ1), V2 (θ2), and V3 (θ3), and a PWM signal is generated for each value. Therefore, even if the output frequency becomes high and the calculation period becomes relatively long, the steps in the staircase-shaped waveform can be made smaller, which allows the waveform to approach a smoother sine wave.

The case where the phase is divided into three parts to obtain three output voltage commands is explained for convenience in explanation. However, the number of output voltage commands capable of being reflected per one calculation period can be selected if necessary according to the throughput of the CPU 14 and the memory size of the ASIC 11, and can also be changed arbitrarily according to need.

As explained above, in the embodiment, the output-voltage command value in which only the phase advances is updated a plurality of times within a calculation period. Therefore, even if there are a small number of calculation periods in the cycle of a fundamental wave of an output voltage, it is possible to obtain an output voltage with a waveform closer to the sine wave. Therefore, the current ripple is reduced more as compared with the conventional technology, thus achieving torque ripple reduction and efficiency increase.

The CPU that calculates an output voltage command only needs to add the function of calculating a plurality of output-voltage command values in which only the phase advances. Thus, the increase in the calculation amount is comparatively small. In addition, the operation for updating the output-voltage command value a plurality of times is performed in the ASIC 11, which is a semiconductor integrated circuit, without performance of processes in the CPU. This allows reduction in the processing load of the CPU, and in addition to this, the calculation period is not reduced, and hence, there is no need to use an expensive CPU.

The explanation made so far indicates the case where the phase is divided into a plurality of parts in a calculation period in which a phase change amount exceeds the predetermined value, but if the cycle of an output voltage is sufficiently large with respect to the calculation period, that is, if the output frequency is low, a large number of calculation periods are included in one cycle of the fundamental wave of an output voltage, and a plurality of output-voltage command values are calculated. Thus, a waveform satisfactorily close to the sine wave can be obtained without outputting a voltage in which a plurality of phases advance in one period of the calculation period.

At step ST6 of FIG. 4, therefore, it is not determined whether the phase is changed, but it is determined whether a frequency command value input to drive the motor is smaller or greater than a predetermined value. If the frequency command value is greater than the predetermined value, a larger number of output-voltage command values than the case where it is smaller than the predetermined value are calculated. Alternatively, if the frequency command value is greater than the predetermined value, a plurality of output-voltage command values may be calculated, and if it is smaller than the predetermined value, one output-voltage command value may be calculated in the same manner as the conventional technology.

As the latter example, for example, if it is sufficient that the calculation period is 500 μseconds and 18 voltage changes are obtained in one calculation period of output voltage, at step ST6, the process for negative (No) is performed so as not to divide the phase into a plurality of parts in an area of an output frequency of $1/(500\mu\times 8)=111.11$ Hz or less. And if the area of the output frequency is more than that, a smaller number of calculation periods are included in one cycle of the fundamental wave of the output voltage. Therefore, to allow update of the voltage to be more quickly performed, the process for positive (Yes) is performed so as to divide the phase into a plurality of parts and calculate the parts, to thereby increase the number of outputs of the output voltage commands in the calculation period.

According to this, the calculation load in a low-speed area can be reduced. Furthermore, a time for calculation only when the output frequency is low can be ensured. The calculation includes, for example, an error correction of an output voltage due to a time for prevention of upper and lower arm short-circuit of the switching circuit.

In the embodiment, there is shown the configuration in which the reflection timing data indicating the number of vertices of the triangular wave signal is included in data exchanged between the CPU and the ASIC, and update timing of the output voltage command can be set in each case, so as to enable handling even a case where automatic update needs to be performed and the calculation period needs to be switched. However, the present invention is not limited by the case, but various modifications are possible.

For example, (1) When timing of automatic reflection is fixed because the calculation period is fixed, a value may be set using hardware by setting ports of the ASIC. (2) The ASIC receives the cycle of a triangular wave signal from the CPU to enable a user to change the cycle of the triangular wave signal, but if the cycle of the triangular wave signal is fixed, there is no need to receive the cycle of the triangular wave signal from the CPU. Accordingly, the CPU does not also need to obtain the cycle of the triangular wave signal. (3) There is shown the case where the reflection timing of the output voltage command in the triangular wave signal is controlled by the number of vertices of the triangular wave signal, but the reflection timing may be set in time base. (4) Furthermore, the synchronization signal is used for a timing signal to synchronize the vertices of the triangular wave signal and the calculation timing of the CPU, but there may be a method of implementation in which the synchronization is not needed.

INDUSTRIAL APPLICABILITY

The present invention is suitable as an inverter device that obtains an alternating voltage with an arbitrary frequency for driving a motor in a waveform more closer to a sine wave, that is, an inverter device that obtains an alternating voltage with less current ripple and capable of reducing torque ripple.

The invention claimed is:

1. An inverter device comprising:
a calculating unit configured to calculate at least one output-voltage command value based on a frequency command value for driving a motor and a state quantity of the motor, in each calculation period;
a signal output unit configured to output a pulse-width-modulation signal according to the output-voltage command value; and
a switching unit configured to switch a direct voltage according to the pulse-width-modulation signal to supply an alternating voltage having a predetermined frequency to the motor, wherein
the calculating unit is configured to calculate a plurality of output-voltage command values when a phase change amount is higher than a threshold, and to calculate a single output-voltage command value when the phase change amount is equal to or less than the threshold, wherein
the calculating unit is configured to calculate more number of output-voltage command values when the frequency command value is higher than a threshold than when the frequency command value is lower than the threshold.

2. An inverter device comprising:
a calculating unit configured to calculate at least one output-voltage command value based on a frequency command value for driving a motor and a state quantity of the motor, in each calculation period;
a signal output unit configured to output a pulse-width-modulation signal according to the output-voltage command value; and
a switching unit configured to switch a direct voltage according to the pulse-width-modulation signal to supply an alternating voltage having a predetermined frequency to the motor, wherein
the calculating unit is configured to calculate a plurality of output-voltage command values when a phase change amount is higher than a threshold, and to calculate a single output-voltage command value when the phase change amount is equal to or less than the threshold, wherein
the calculating unit is configured to calculate a plurality of output-voltage command values when the frequency command value is higher than a threshold, and to calculate a single output-voltage command value when the frequency command value is lower than the threshold.

* * * * *